United States Patent [19]

Jaenisch

[11] Patent Number: 4,949,353
[45] Date of Patent: Aug. 14, 1990

[54] LASER PROCESSING

[75] Inventor: Holger Jaenisch, Rosemead, Calif.

[73] Assignee: Talandic Research Corporation, Azusa, Calif.

[21] Appl. No.: 293,264

[22] Filed: Jan. 4, 1989

[51] Int. Cl.$^5$ ............................................. H01S 3/22
[52] U.S. Cl. ........................................ 372/59; 372/34; 372/37; 372/33
[58] Field of Search .................... 372/59, 58, 34, 37, 372/60, 58, 33

[56] References Cited

U.S. PATENT DOCUMENTS

| | | | |
|---|---|---|---|
| 3,970,957 | 7/1976 | Regan | 372/59 |
| 4,068,196 | 1/1978 | Hohla et al. | 372/59 |
| 4,188,592 | 2/1980 | Buczek et al. | 372/59 |
| 4,414,670 | 11/1983 | Limpaecher | 372/59 |
| 4,541,096 | 9/1985 | Walsh, IV | 372/59 |
| 4,611,327 | 9/1986 | Clark et al. | 372/58 |
| 4,674,098 | 6/1987 | Turner | 372/59 |
| 4,723,254 | 2/1988 | Turner | 372/59 |
| 4,847,841 | 7/1989 | Lamprecht et al. | 372/34 |

OTHER PUBLICATIONS

Holger M. Jaenisch, "Ion Laser Repair and Processing", O-E/Fiber Lase Boston '88, SPIE Sep. 7, 1988.
Holger M. Jaenisch, "Krypton Processing of Argon-ion Lasers", SPIE, vol. 894, Gas Laser Technology, Jan. 11, 1988.

Primary Examiner—Leon Scott, Jr.
Attorney, Agent, or Firm—Norman E. Brunell

[57] ABSTRACT

A modified laser tube including a second pinch off tube or port for flowing argon and krypton gas through the laser for processing to remove contaminants to improve performance of new and used tubes such as ALC 60X argon ion lasers. Lasing discharge is maintained during processing to release contaminants for removal by plasma scrubbing of the laser bore. A magnetic field is applied and rotated in a plane perpendicular to the laser during discharge to enhance contamination release during plasma scrubbing. Preliminary cathode activation, control of gas flow rates and tube power as well as alternating of argon and krypton gas controls the contaminant release rate to prevent recontamination of the laser by released contaminants before removal.

33 Claims, 1 Drawing Sheet

LASER PROCESSING

BACKGROUND OF THE INVENTION

The present invention relates generally to ion discharge lasers and in particular to method and apparatus for processing laser tubes for improved performance. Processing is used during manufacture of new laser tubes and during remanufacture or reprocessing of used laser tubes to improve performance by removing contaminates from the laser, particularly from the cathode and the ceramic matrix of tube bore.

Conventional processing systems for laser tubes require multi-day operation of the tube during which tube bake-out, processing and pinch off is accomplished to remove contaminants and prepare the tube for operation. Preprocessing of certain tubes with using oxygen as a processing gas has been used to accelerate this process, but has resulted in cathode poisoning, metal oxidation of tube components and bore contamination.

Processing of used laser tubes has conventionally included tube bore out, acid etch or bead blasting to attempt to reduce or remove laser tube bore contamination and to permit the tube to be returned to normal operating conditions. These approaches however result in changes to the physical and therefore operating characteristics of the tubes and have not been particularly satisfactory.

SUMMARY OF THE INVENTION

Laser processing according to the present invention utilizes a laser tube with an additional pinch off tube or port and includes flow through, heavy gas and magnet processing. During processing a flow of processing gas is used to carry away tube contaminants released by cathode activation or cathode heating and/or by lasing discharge, particularly when the processing gas includes higher atomic weight atoms than those in the normal the lasing gas. A convenient processing gas for argon ion gas lasers is krypton gas.

The contamination release rate and the processing gas flow rate are during cathode activation and/or laser discharge processing to prevent recontamination of other portions of the laser by the released contaminants. Discharge and non-discharge processing as well as heavy gas and lasing gas processing are alternated to prevent recontamination.

During laser discharge processing, particularly during application of the heavy atom processing gas, a magnetic field is applied to the laser bore in a plane perpendicular thereto to enhance contamination release by urging the discharge plasma into contact with the internal walls of the laser bore. The resultant plasma scrubbing is applied to the entire interior surface of the bore by rotating the magnetic field in the perpendicular plane about the laser.

BRIEF DESCRIPTION OF THE DRAWING

The FIGURE is a sectional view of an air-cooled, ion gas laser including a second pinch off tube and permanent magnet according to the present invention.

DETAILED DESCRIPTION OF THE PREFERRED EMBODIMENT

Figure 1:
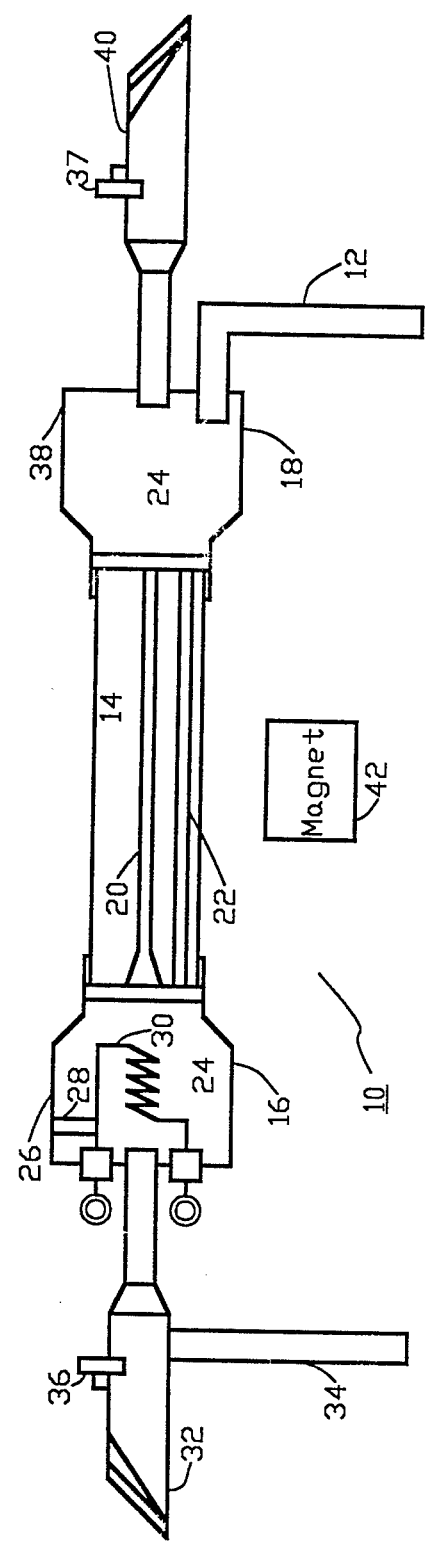

The Figure shows laser tube 10 which may be a conventional laser tube such as an American Laser Company 60X argon ion laser tube modified to include gas out pinch off tube 12, described below in greater detail.

The structure of laser tube 10 may be originally constructed in manner shown in the Figure, or modified before or after use in operation to include gas out pinch off tube 12.

Laser tube 10 includes a conventional discharge bore 14 mounted between cathode assembly 16 and anode assembly 18. Bore 14 is typically constructed from a rod of beryllium oxide, BeO, drilled out to include central bore 20 and internal gas return path 22. Bore 14 is mounted and sealed between cathode assembly 16 and anode assembly 18 to form gas tight chamber 24. During normal operation of laser tube 10, gas tight chamber 24 is filled with argon gas.

Cathode assembly 16 may be of conventional design and construction and is formed from cathode shroud 26 which houses getter 28 and co-axial cathode 30. Cathode assembly 16 is connected to cathode Brewster stub 32 which includes gas in pinch off tube 34 and cathode tickler 36. During conventional processing of laser tube 10, argon gas would be introduced into and evacuated from gas tight chamber 24 via gas in pinch off tube 34 which would then be sealed gas tight by conventional means, not shown.

Anode assembly 18 includes anode shroud 38 which is connected to conventional anode Brewster stub 40, which includes anode tickler 37 and gas out pinch off tube 12. Gas out pinch off tube 12 is not utilized during normal operation of laser tube 10 and therefore may either be originally included during manufacture or remanufacture of laser tube 10 or, in accordance with a preferred embodiment of the instant invention, added in any convenient manner during reprocessing of a used tube.

Because gas out pinch off tube 12 is not used during normal operation of laser tube 10, such normal operation of laser tube 10 is strictly conventional and is therefore not described herein.

Ion laser processign includes the steps of bake-out, processing and pinch off. Bake-out is a conventional process used to remove contaminants from laser tube 10 by the long term application of heat and will therefore not be described herein in detail.

Processing according to the instant invention includes the procedures of flow through processing, and heavy gas or krypton processing and permanent magnet processing, all discussed herein below.

Heavy gas processing is used to liberate additional contaminants from central bore 20 by generating more heat in central bore 20 than can be achieved conveniently during bake-out. According to the instant invention, processing is accomplished with ions having a greater atomic weight than used during normal operation of the laser.

In the example of an ALC 60X argon ion laser described herein, krypton gas may be conveniently used for heavy gas processing. For laser systems using another gas, it is well within the skill of a man of ordinary skill in this art to select an appropriate gas for heavy gas processing based on the difference in atomic weights of the gases.

Krypton gas may be used by itself for heavy gas processing during flow through processing, as described in more detail below, because the flow through processing will support a stable krypton discharge in laser tube 10. Because it would be difficult to sustain pure krypton discharge in a conventional tube designed for lasing operation with argon gas, a stable mixed gas discharge may be achieved using a mixture of two parts krypton to eight part argon and one part helium. The use of this heavy gas mixture permits the beneficial of heavy gas processing without the addition of gas out pinch off tube 12 to a conventionallly designed laser tube.

The krypton atom is more massive than the argon atom and can therefore impart more energy to the walls of central bore 20 for a collision at a given velocity. This higher energy results in a greater scrubbing action than is achieved with argon. In addition, sustained discharge during krypton processing results in higher temperature plasma because of the krypton than is produced during normal operation with argon. This higher temperature operation substantially reduces contamination of central bore 20 without adding additional contamination or other operating problems.

It is essential to sustain discharge during krypton processing to insure higher localized heating and cleaning of central bore 20. As noted above, a sustained discharge may be achieved in a conventional argon ion tube not capable of flow through processing with the use an appropriate heavy gas mixture.

The discharge is successfully sustained in laser tube 10 using pure krypton gas by providing flow through processing, that is, by pumping a constant flow of lasing gas into central bore 20 via gas in pinch off tube 34 and evacuating the gas during processing via gas out pinch off tube 12. This permits sustained krypton discharged by maintaining constant pressure in cathode shroud 26. The hot gas picks up contaminants in central bore 20 and the contaminated gas is then purged via gas out pinch off tube 12.

The flowing gas cools co-axial cathode 30 and bore 14 permitting operation at higher temperatures of co-axial cathode 30. The primary lasing discharge may be operated at higher current densities without damage to metal-ceramic seals in laser tube 10.

The scrubbing action of the higher temperature plasma discharge is enhanced, according to the instant invention, by application of a non-axial magnet field generated, for example, by magnet 42 positioned adjacent bore 14. The field of magnet 42 serves to compress the plasma discharge against the walls of central bore 20 and to generate localized higher temperatures and increased plasma scrubbing action to further drive contaminants from bore 14.

Conventional applications of magnet fields to lasers tubes have used axial magnetic fields, that is, fields which serve to maintain and concentrate the plasma within central bore 20 in order to enhance operation of the laser and minimize contact of the plasma with the interior walls of bore 14. The term "non-axial magnetic field" is used herein to describe a field oriented to cause or enhance contact of the plasma with the interior surfaces of bore 14.

The localized action of magnet 42 is applied to the major portion of the inner walls of central bore 20 by moving magnet 42 around bore 14 in a plane perpendicular to central bore 20. A convenient permanent magnet which may be successfully used as magnet 42 is one of the permanent magnets from a 60 liter Varian Vac-Ion pump. This permanent magnet has a field strength of about one KGauss and provides a magnet field which is not axially uniform with respect to laser tube 10. The field of a suitably design electromagnet may, of course, also be used. Rotation of magnet 42 completely around laser tube 10 is preferred. The physical configuration of laser tube 10, such as ducts for cooling may may this difficult during practice, but rotation about an angle of 320° has been shown to apply the localized effect of magnet 42 to the walls of central bore 20 sufficiently to provide adequate plasma scrubbing.

The specific details of the procedure used in processing a laser are dependent upon the construction of the laser to be processed, the history of prior use of the laser, if any, and various other aspects of the laser including the specifics of the desired results.

The procedure used for processing certain new and used ALC 60X argon ion laser tubes is presented herein below as an example to illustrate the instant invention. This example is taken from the article entitled "Krypton processing of argon-ion lasers" authored by the inventor hereof and included in Volume 984 of *PROCEEDINGS OF SPIE - The International Society for Optical Engineering*, presented in Los Angeles on Jan. 11 and 12, 1988. Additional details are available therein. The steps are presented in the order applied.

BAKE-OUT

A modified, shortened bake-out procedure may be first used to prepare laser tube 10 for further processing. Satisfactory bake-out may be achieved at 425° F. in two hours at a vacuum of only about $1 \times 10^{-6}$ torr.

FLOW THROUGH PROCESSING

CATHODE ACTIVATION

Contaminants may be removed from co-axial cathode 30 by sputtering without redeposition within cooler parts of laser tube 10 by flow through processing with argon while applying power only to co-axial cathode 30. The argon is supplied to laser tube 10 via gas in pinch off tube 34 and removed from laser tube 10 via gas out pinch off tube 12. The power applied to co-axial cathode 30 should be increased gradually while increasing the flow rate of the argon gas. At lower power, heat may be applied externally to cathode assembly 16 by, for example, a heat gun not shown. At higher power, cooling may be required. Suitable cathode current, application time, argon flow rates, and cooling parameters are shown below in tabular form for a convenient procedure sequence.

| CATHODE ACTIVATION | | | |
|---|---|---|---|
| Filament Current | Time | Argon Flow Rate | Heating/Cooling |
| 5 Amp. | 10 min. | 1.0 liter per min. | none |
| 10 Amp. | 30 min. | 1.0 liter per min. | none |
| 15 Amp. | 30 min. | 0.5 liter per min. | none |
| 20 Amp. | 30 min. | 0.5 liter per min. | heat |
| 25 Amp. | 30 min. | 1.0 liter per min. | cool |
| 30 Amp. | 15 min. | 1.5 liter per min. | cool |
| 30 Amp. | 15 min. | 0.5 liter per min. | heat |
| 25 Amp. | 15 min. | 0.0 liter per min. | cool |

KRYPTON PROCESSING

Subsequent processing with krypton serves to further reduce contamination within laser tube 10. After a gas flow rate of about 1.0 liter per minute is established, power is then applied slowly over about 30 second to 1 minute to cathode assembly 16. Power is then applied to anode assembly 18 and a trigger discharge is used to start laser tube 10 in a conventional manner except, of course, that the discharge is in the krypton gas, not in argon gas.

This procedure is applied for 15 minutes after which the flow rate is reduced to 0.5 liters per minute and the procedure is continued for 60 minutes. Then laser tube 10 should be evacuated and operated with argon gas until appropriate operating parameters are achieved.

MAGNETIC PROCESSING

The plasma scrubbing action resulting from the heavy gas processing described above under the title KRYPTON PROCESSING may be greatly enhanced by repetition of the procedure with the addition of magnet 42. Magnet 42 is mounted adjacent bore 14 and rotated in a plane perpendicular to the axis of central bore 20 while laser tube 10 is operated during both argon and krypton gas flows. As noted above, the non-axial field of magnet 42 serves to push the plasma into contact with the interior walls of bore 14 and drive contaminants out which will then be purged by the flowing gas from central bore 20.

Although in some situations it will be possible to skip the first cycle of krypton flow through processing, that is, the cycle in which a magnetic field is not used, the rate of release of contaminants during processing with the magnetic field is so great that the laser may fail unless a substantial portion of the contaminants have already been removed by some means.

After completion of the second cycle of processing with krypton gas, magnet 42 should be removed and operation under argon gas flow should be continued for an additional 2 hours during which time no additional changes in operating parameters should be noticed.

PINCH OFF

After completion of bake-out and flow through processing including krypton and permanent magnet processing, laser tube 10 should be evacuated and gas in pinch off tube 34 should be sealed in a conventional manner. After laser tube 10 has been allowed to stabilize, gas out pinch off tube 12 should also be sealed in conventional manner. Laser tube 10 may then be placed in normal operation.

I claim:

1. A method for processing ion gas lasers of the type having a discharge tube including a cathode and a discharge bore to reduce contamination of the discharge tube, comprising the steps of removing lasing gas from the discharge tube:
   flowing a processing gas though the discharge tube to release contaminants from the cathode and the structure of the discharge bore to remove the contaminants from the laser.

2. The method of claim 1, wherein the processing gas flow step further comprises the steps of:
   providing processing gas to the laser via an inlet port connected thereto; and
   evacuating processing gas from the laser via an outlet port connected thereto.

3. The method of claim 2, wherein the laser includes a single port for the introduction and evacuation of lasing gas, further comprising the preliminary step of:
   providing an additional port to the laser for evacuation of processing gas therefrom.

4. The methods of claims 2 or 3 wherein the contamination release step includes the step of:
   heating the cathode to release contaminants therefrom into the processing gas without causing laser discharge.

5. The method of claim 4 wherein the cathode heating step includes the steps of:
   applying power to the cathode; and
   applying heat from an external source to the laser.

6. The method of claim 4 wherein the cathode heating step further comprises the steps of:
   varying the cathode temperature to control the rate of contaminate release therefrom; and
   varying the processing gas flow rate in accordance with the cathode contamination release rate to evacuate contaminants from the laser without recontamination thereof.

7. The method of claim 6 wherein the laser is configured for normal lasing operation with a specific lasing gas and the lasing gas is provided to the laser as the processing gas.

8. The method of claim 6 wherein the laser is configured for normal lasing operation with a specific lasing gas and the processing gas includes atoms of greater atomic weight.

9. The method of claim 8 wherein the lasing gas is argon and the processing gas is krypton.

10. The method of claim 8 wherein the contamination release step includes the subsequent step of:
    discharging the laser to release contaminants from the bore.

11. The method of claim 10 wherein the laser discharge is sustained for a substantial time period to release the sufficient contaminants from the discharge bore to improve the operation of the laser during lasing gas discharge.

12. The method of claim 10 wherein the laser discharge step includes the steps of:
    flowing lasing gas through the laser;
    discharging the laser through the lasing gas;
    then flowing processing gas through the laser; and discharging the laser through the processing gas.

13. The method of claim 12 wherein the laser discharge is sustained in the lasing gas for a substantial time period to release sufficient contaminants from the discharge bore to permit subsequent laser discharge through the processing gas without recontaminating the laser.

14. The method of 10 further comprising the step of:
    applying a magnetic field to the bore during laser discharge to enhance the release of contaminants therefrom.

15. The method of claim 10 further comprising the step of:
    applying a magnetic field in a plane substantially perpendicular to the bore during laser discharge to enhance the release of contaminants therefrom.

16. The method of claim 15 wherein the magnetic field applying step further comprises:
    rotating the field in the perpendicular plane to further enhance the release of contaminants.

17. The method of claim 10 wherein the laser discharge step includes the steps of:
    flowing lasing gas through the laser;
    discharging the laser through the lasing gas;
    flowing processing gas through the laser;
    discharging the laser through the processing gas;
    flowing lasing gas through the laser;
    applying a magnetic field in a plane substantially perpendicular to the bore to enhance the release of contaminants during lasing discharge therefrom;
    discharging the laser through the lasing gas;
    flowing processing gas through the laser; and discharging the laser through the processing gas.

18. The method of claim 14 wherein the magnetic field applying step further comprises: rotating the field in the perpendicular plane during lasing discharge to further enhance the release of contaminants.

19. The methods of claim 2 or 3 wherein the laser is configured for normal lasing operation with a specific lasing gas and the processing gas includes atoms of greater atomic weight.

20. The method of claim 19 wherein the contamination release step includes the subsequent step of:
   discharging the laser to release contaminants from the bore.

21. The method of claim 20 wherein the laser discharge step includes the steps of:
   flowing lasing gas through the laser;
   discharging the laser through the lasing gas;
   then flowing processing gas through the laser; and
   discharging the laser through the processing gas.

22. The method of 21 further comprising the step of:
   applying a magnetic field to the bore to enhance the release of contaminants therefrom.

23. The method of claim 22 further comprising the step of:
   applying a magnetic field in a plane substantially perpendicular to the bore to enhance the release of contaminants therefrom.

24. The method of claim 23 wherein the magnetic field applying step further comprises:
   rotating the field in the perpendicular plane to further enhance the release of contaminants.

25. The method of claim 24 wherein the laser discharge step includes the steps of:
   flowing lasing gas through the laser;
   discharging the laser through the lasing gas;
   flowing processing gas through the laser;
   discharging the laser through the processing gas;
   flowing lasing gas through the laser;
   applying a magnetic field in a plane substantially perpendicular to the bore to enhance the release of contaminants therefrom;
   discharging the laser through the lasing gas;
   flowing processing gas through the laser; and
   discharging the laser through the processing gas.

26. The method of claim 25 wherein the magnetic field applying step further comprises:
   rotating the field in the perpendicular plane during lasing discharge to further enhance the release of contaminants.

27. A method for processing used argon ion gas lasers to improve performance thereof by reducing contamination, in the bore structure comprising the steps of:
   adding a second port to the laser;
   flowing krypton gas into the laser;
   releasing contaminants from the structure or the bore into the krypton gas; and
   evacuating the contaminated krypton gas from the laser via the second port.

28. The method of claim 27 wherein the contamination release step includes the subsequent step of:
   discharging the laser to release contaminants from the bore.

29. The method of claim 28 wherein the laser discharge step includes the steps of:
   flowing argon gas through the laser;
   discharging the laser through the argon gas;
   then flowing krypton through the laser; and
   discharging the laser through the krypton gas.

30. The method of claim 29 further comprising the step of: applying a magnetic field in a plane substantially perpendicular to the bore the enhance the release of contaminants therefrom during lasing discharge.

31. The method of claim 30 wherein the magnetic field applying step further comprises:
   rotating the field in the perpendicular plane to further enhance the release of contaminants.

32. The method of claim 28 wherein the laser discharge step includes the steps of:
   flowing argon gas through the laser;
   discharging the laser through the argon gas;
   flowing krypton gas through the laser;
   discharging the laser through the krypton gas;
   flowing argon gas through the laser;
   applying a magnetic field in a plane substantially perpendicular to the bore to enhance the release of contaminants therefrom;
   then discharging the laser through the argon gas;
   flowing krypton gas through the laser; and
   discharging the laser through the krypton gas.

33. The method of claim 32 wherein the magnetic field applying step further comprises:
   rotating the field in the perpendicular plane during lasing discharge to further enhance the release of contaminants.

* * * * *